(12) United States Patent
Mizusawa

(10) Patent No.: US 7,764,643 B2
(45) Date of Patent: Jul. 27, 2010

(54) WIRELESS COMMUNICATION SYSTEM, TRANSMITTING DEVICE AND RECEIVING DEVICE

(75) Inventor: Hitoshi Mizusawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 679 days.

(21) Appl. No.: 11/709,237

(22) Filed: Feb. 22, 2007

(65) Prior Publication Data

US 2007/0218843 A1 Sep. 20, 2007

(30) Foreign Application Priority Data

Mar. 17, 2006 (JP) .............................. 2006-074359

(51) Int. Cl.
*H04W 4/00* (2009.01)
(52) U.S. Cl. ................... 370/328; 370/329; 370/338; 455/450; 455/452.2; 455/418; 455/522
(58) Field of Classification Search ................ 370/328, 370/329, 338; 455/450, 452.2, 418, 522
See application file for complete search history.

(56) References Cited

U.S. PATENT DOCUMENTS

| | | | | |
|---|---|---|---|---|
| 5,483,666 | A * | 1/1996 | Yamada et al. | ............... 455/454 |
| 7,283,498 | B2 | 10/2007 | Ro et al. | |
| 2002/0191578 | A1 | 12/2002 | Bachl et al. | |
| 2005/0147043 | A1* | 7/2005 | Schelstraete et al. | ........ 370/236 |

FOREIGN PATENT DOCUMENTS

JP 2003-32146 1/2003

OTHER PUBLICATIONS

Korean Patent Office; Notification for Submission of Argument; Application No. 10-2007-23453; Dated Jan. 29, 2008 (1-Korean language & 1-English translation of same); 4-pages each.
Korean Patent Application; Application No. 2003-0075117; Dated Sep. 22, 2003; 8 pages (Corresp. with US 7,283,498 B2).
3GPP TR 25.814 V0V1.50.0 1, 3rd Generation Partnership Project; Technical Specification Group Radio Access Network; Physical Layer Aspects for Evolved UTRA.
Notification for Submission of Argument from Korean Patent Office in Korean Patent Application No. 10-2008-0092952 (dated Feb. 13, 2009).
Simeone, O. and U. Spagnolini, "Adaptive Pilot Pattern for OFDM Systems." Dip. di Electronica e Informazione, Politecnico di Milano. P.zza L., da Vinci, 32 I-20133 Milano (Italy).

* cited by examiner

*Primary Examiner*—Nghi H Ly
(74) *Attorney, Agent, or Firm*—Hanify & King, PC

(57) ABSTRACT

A wireless communication system has a transmitting device and a receiving device that perform communication by using a multi-carrier signal wherein the receiving device includes a quality generating unit generating each piece of receiving quality information on each pilot channel for transmitting each pilot signal, a determining unit determining the number of pilot channels needed in the multi-carrier signal based on the receiving quality information, and a notifying unit transmitting a signal requesting the determined number of pilot channels to the transmitting device, and the transmitting device includes an allocation unit determining allocations of pilot signals in the direction of the time axis and in the direction of the frequency axis, corresponding to a requested number of pilot channels, and a transmitting unit transmitting the multi-carrier signal having the determined pilot signal allocations.

13 Claims, 12 Drawing Sheets

FIG. 8

| CONTENTS | BIT COUNT | OPERATIONS |
|---|---|---|
| PROCESS IN THE DIRECTION OF THE FREQUENCY AXIS | 1 | 0: NO PROCESS<br>1: PROCESSING |
| PROCESS IN THE DIRECTION OF THE TIME AXIS | 1 | 0: NO PROCESS<br>1: PROCESSING |
| ADDITION/REDUCTION OF THE PILOT SYMBOLS | 1 | 0: ADDED<br>1: REDUCED |
| STATUS | 1 | 0: STATUS OF LAST TIME IS RETAINED<br>1: REQUEST IS REFLECTED |
| ALL-PILOT REQUEST | 1 | 0: NORMAL STATUS<br>1: ALL-PILOT REQUEST |

LSB ←→ MSB

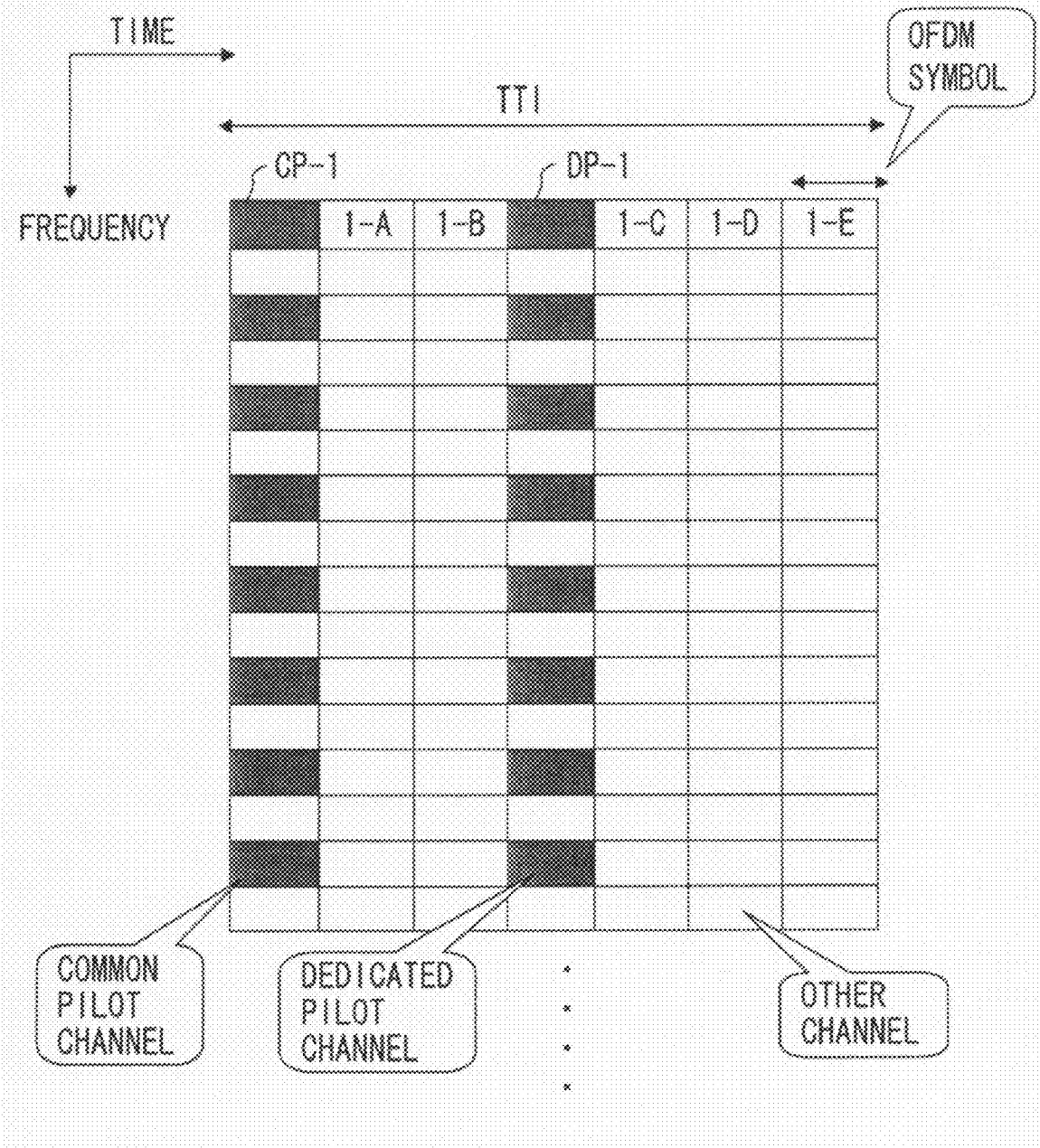

WIRELESS COMMUNICATION SYSTEM, TRANSMITTING DEVICE AND RECEIVING DEVICE

BACKGROUND OF THE INVENTION

1. Field of the Invention

The present invention relates to a wireless communication system, a transmitting device and a receiving device that perform channel estimation by use of pilot signals etc in a multi-carrier transmission method.

2. Description of the Related Art

An OFDM (Orthogonal Frequency Division Multiplexing) method is adopted as a transmission method in a variety of communication systems and actualizes high-speed data communications at high frequency availability efficiency. The OFDM method is defined as a method of segmenting transmission data into plurality of data, mapping the segmented transmission data onto a plurality of orthogonal carrier waves (subcarriers), and transmitting the data in parallel along a frequency axis.

An examination of a radio frame format employed in such a type of wireless communications is now under consideration in the 3GPP (3rd Generation Partnership Project) etc, and FIG. 12 shows an example of this radio frame format. In the radio frame format illustrated in FIG. 12, each frame is provided at a TTI (Transmission Time Interval) interval, wherein OFDM symbols are allocated in a frequency (an axis of ordinate)-to-time (an axis of abscissa) array within each frame. Further, each frame is generated by a plurality of subcarriers, and each subcarrier consists of 7 symbols along the time axis. Allocated to each subcarrier are a common pilot channel (Common Pilot Channel), a dedicated pilot channel (Dedicated Pilot Channel) and other channels (Other Channels which will hereinafter be referred to as data channels), respectively. A pilot symbol common to all users is allocated to the common pilot channel, a dedicated pilot symbol assigned corresponding to each of predetermined users is allocated to the dedicated pilot channel, and data symbols are allocated to the data channels.

In a receiving device utilizing this type of frame format, influence by fading is compensated by a propagation characteristic value (a channel estimation value) etc estimated by use of this pilot symbol. In this case, the fading influence is different for every symbol, and hence the receiving device is required to interpolate the channel estimation value on the frequency axis and on a time axis on the occasion of demodulating each symbol. For instance, the example in FIG. 12 illustrates that the channel estimation value existing in each symbol position is linearly interpolated by use of a pilot symbol CP-1 and a pilot symbol DP-1, and symbols 1-A and 1-B are demodulated based on the thus-obtained channel estimation value.

It should be noted that the following documents disclose the conventional arts related to the invention of the present application. The conventional art documents are "Japanese Patent Application Laid-Open Publication No. 2003-032146" and "Technical Specification Group Radio Access Network, "Physical Layer Aspects for Evolved UTRA (Release 7)", 3rd Generation Partnership Project, 3GPP TR 25.814 V1.0.1, November 2005, p. 22-24."

It is known that in the radio frame format described above, the number of the pilot symbols and positions of the pilot symbols to be allocated largely contribute to communication performance such a received error rate. For example, it follows that a transmission rate decreases though channel estimation accuracy is improved in the case of increasing the number of the pilot symbols, and the received error rate is deteriorated while the channel estimation accuracy is lowered in the case of decreasing the number of the pilot symbols. Further, the fading influence depends on a propagation environment etc, and hence, even when using the radio frame having the same pilot symbol allocation, the channel estimation accuracy based on this pilot symbol allocation changes corresponding to the propagation environment etc.

SUMMARY OF THE INVENTION

It is an object of the present invention, which was devised in view of the problems described above, to provide a wireless communication system, a transmitting device and a receiving device that attain an excellent error rate characteristic without depending on the propagation environment.

The present invention adopts the following configurations in order to solve the problems. Namely, the present invention relates to a receiving device receiving a multi-carrier signal in which plural pilot signals transmitted from a transmitting device are allocated in a direction of a time axis and in a direction of a frequency axis, the receiving device comprising a quality generating unit generating each piece of receiving quality information on each pilot channel for transmitting each pilot signal, a determining unit determining the number of pilot channels needed in the multi-carrier signal transmitted from the transmitting device based on the generated receiving quality information, and a notifying unit transmitting a signal requesting the determined number of pilot channels to the transmitting device.

In the present invention, the receiving quality information giving a propagation (channel) environment acting on each pilot channel is generated. This receiving quality information is exemplified such as an SINR (Signal to Interference and Noise Ratio) and a bit error rate (BER). In the present invention, the necessary number of pilot channels in the signals transmitted from the transmitting device is determined based on each piece of generated receiving quality information, and the transmitting device is notified of this determined number of pilot channels. Herein, "the number of pilot channels to be determined" does not specify only the number in an absolute meaning, and any one of an increase and a decrease in the number of pilot channels may also be determined.

With this contrivance, the transmitting device notified of the requested number of pilot channels is capable of generating the radio frame having the pilot configuration that meets the request. Therefore, according to the present invention, the propagation environment can be promptly reflected in the configuration of the pilot channels, so that it is possible to prevent a decrease in the transmission rate due to the futile allocation of the pilot channels while scheming to improve the communication performance such as the receiving error rate.

Further, in the present invention, the determining unit may determine the necessary number of pilot channels in the direction of the frequency axis based on the receiving quality information on the neighboring pilot channels in the direction of the frequency axis, and/or may determine the necessary number of pilot channels in the direction of the time axis based on the receiving quality information on the neighboring pilot channels in the direction of the time axis. Information to be referred to when determining the necessary number of pilot channels may involve using differences in the receiving quality information between the neighboring pilot channels or an average value of these differences.

Hence, according to the present invention, it is feasible to take the proper pilot channel configuration in which the propagation environment is concretely reflected.

Still further, in the present invention, the determining unit may determine to increase and decrease the necessary number of pilot channels in the direction of the frequency axis by comparing a value obtained from the receiving quality information on the neighboring pilot channels in the direction of the frequency axis with a predetermined threshold value, and/or may determine to increase and decrease the necessary number of pilot channels in the direction of the time axis by comparing a value obtained from the receiving quality information on the neighboring pilot channels in the direction of the time axis with a predetermined threshold value. The value compared with the predetermined threshold value may involve using the differences in the receiving quality information between the neighboring pilot channels or the average value of these differences.

Yet further, in the present invention, the determining unit may determine a request for an all-pilot frame by comparing a value obtained from the receiving quality information on the neighboring pilot channels in the direction of the frequency axis with a predetermined upper limit threshold value, and/or may determine the request for the all-pilot frame by comparing a value obtained from the receiving quality information on the neighboring pilot channels in the direction of the time axis with a predetermined upper limit threshold value, and the notifying unit may notify the transmitting device of a signal requesting the all-pilot frame. Moreover, the value compared with the predetermined upper limit threshold value may involve using the differences in the receiving quality information between the neighboring pilot channels or the average value of these differences.

In the present invention, the receiving quality information (the differences in each piece of the receiving quality information or the average value of these differences) on the neighboring pilot channels in the direction of the frequency axis and/or in the direction of the time axis is compared with the predetermined upper limit threshold value, thereby determining whether the all-pilot frame is requested or not. The all-pilot frame represents such a frame that only the pilot channels are allocated within the radio frame. With this scheme, in the case of receiving the signal containing this all-pilot frame, it follows that the receiving quality information is generated with respect to all the pilot channels, and the process of determining the number of pilot channels as described above is executed based on all pieces of generated receiving quality information.

Therefore, according to the present invention, even in a case where there increases the difference in the receiving quality information between the pilot channels, i.e., even in a case where fading exerts large influence, the control can be conducted so as to immediately have the proper pilot channel allocation. Hence, the control is carried out so as to take the proper pilot channel allocating configuration corresponding to a now-and-then propagation environment, whereby the device can be made less likely to be affected by the fading that depends on the propagation environment etc.

Moreover, the present invention also relates to a transmitting device receiving a signal containing a requested number of pilot channels, which is transmitted from the notifying unit of the receiving device. The transmitting device according to the present invention may comprise an allocation unit determining allocations of pilot signals in a direction of a time axis and in a direction of a frequency axis, corresponding to a requested number of pilot channels of which a receiving device notifies, and a transmitting unit transmitting a multi-carrier signal having the determined pilot signal allocations.

With this contrivance, the transmitting device generates the radio frame in which to reflect the requested number of pilot channels of which the receiving device notifies.

Hence, according to the present invention, the propagation environment can be promptly reflected in the pilot channel configuration, thereby making it possible to prevent a decrease in transmission rate due to the futile allocation of the pilot channels while scheming to improve the communication performance such as the receiving error rate.

Further, in the transmitting device according to the present invention, the transmitting unit, when the receiving device notifies the transmitting unit of a request for an all-pilot frame, may transmit the multi-carrier signal having the all-pilot frame.

With this contrivance, the receiving device becomes capable of immediately grasping the necessary number of pilot channels or the pilot channel allocation based on the propagation environment.

It should be noted that the present invention also relates to a wireless communication system comprising the receiving device and the transmitting device described above. Moreover, the present invention may also be a program that actualizes any of functions related to the receiving device and to the transmitting device, and may further be a readable-by-computer storage medium stored with such a program.

According to the present invention, it is possible to actualize the wireless communication system, the transmitting device and the receiving device that attain the excellent error rate characteristic without depending on the propagation environment.

BRIEF DESCRIPTION OF THE DRAWINGS

FIG. 8 is a table showing an example of notification of the pilot channel allocation information;

FIG. 12 is a diagram showing a format of a conventional radio frame.

DESCRIPTION OF THE PREFERRED EMBODIMENTS

A wireless communication device in an embodiment of the present invention will hereinafter be described with reference to the drawings. The wireless communication device in the present embodiment encompasses, e.g., a mobile terminal and a base station device (an access point) that perform wireless communications with each other. It is to be noted that the following discussion shall deal with the wireless communication device in the present embodiment in the way of its being categorized into a receiving device and a transmitting device for explanatory convenience's sake. The present invention is not, however, limited to this configuration and may be applied to a communication device including both of a receiving function and a transmitting function that will hereinafter be explained. Throughout the discussion, a configuration in the following embodiment is an exemplification, and the present invention is not limited to the configuration in the embodiment.

Receiving Device

Figure 1:
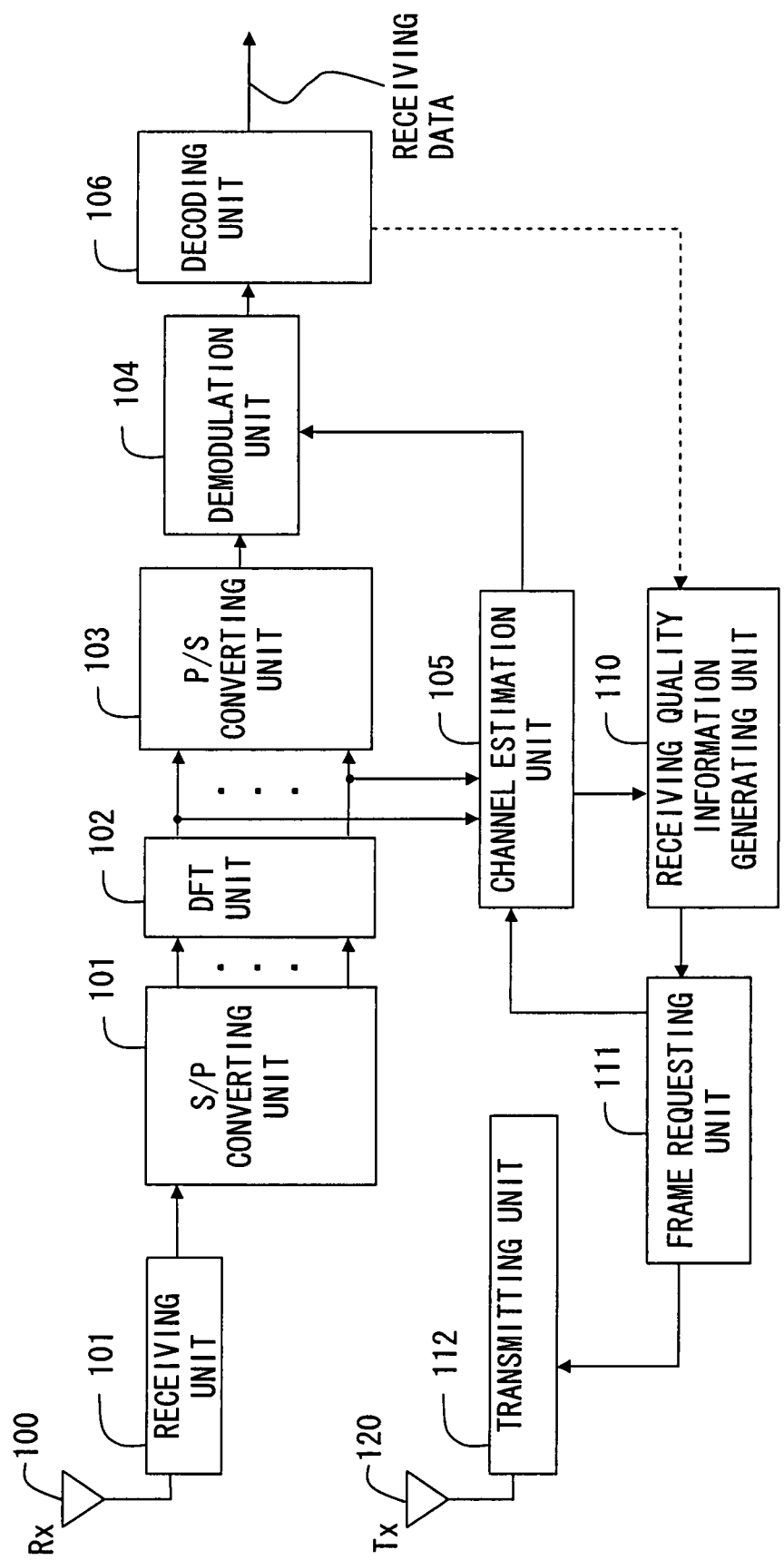
FIG. 1 is a diagram showing a functional configuration of a receiving device in the present embodiment.

The receiving device in the embodiment of the present invention will be explained with reference to FIG. 1. FIG. 1 is a diagram showing a functional configuration of the receiving device in the present embodiment.

The receiving device in the present embodiment includes a receiving antenna 100, a receiving unit 101, a serial/parallel (which will hereinafter be abbreviated to S/P) converting unit 101, a discrete Fourier transform (which will hereinafter be abbreviated to DFT) unit 102, a parallel/serial (which will hereinafter be abbreviated to P/S) converting unit 103, a demodulation unit 104, a channel estimation unit 105, a decoding unit 106, a receiving quality information generating unit 110 (corresponding to a quality generating unit and a determining unit according to the present invention), a frame requesting unit 111 (corresponding to the determining unit according to the present invention), a transmitting unit 112 (corresponding to a notifying unit according to the present invention), a transmitting antenna 120, etc.

Figure 2:
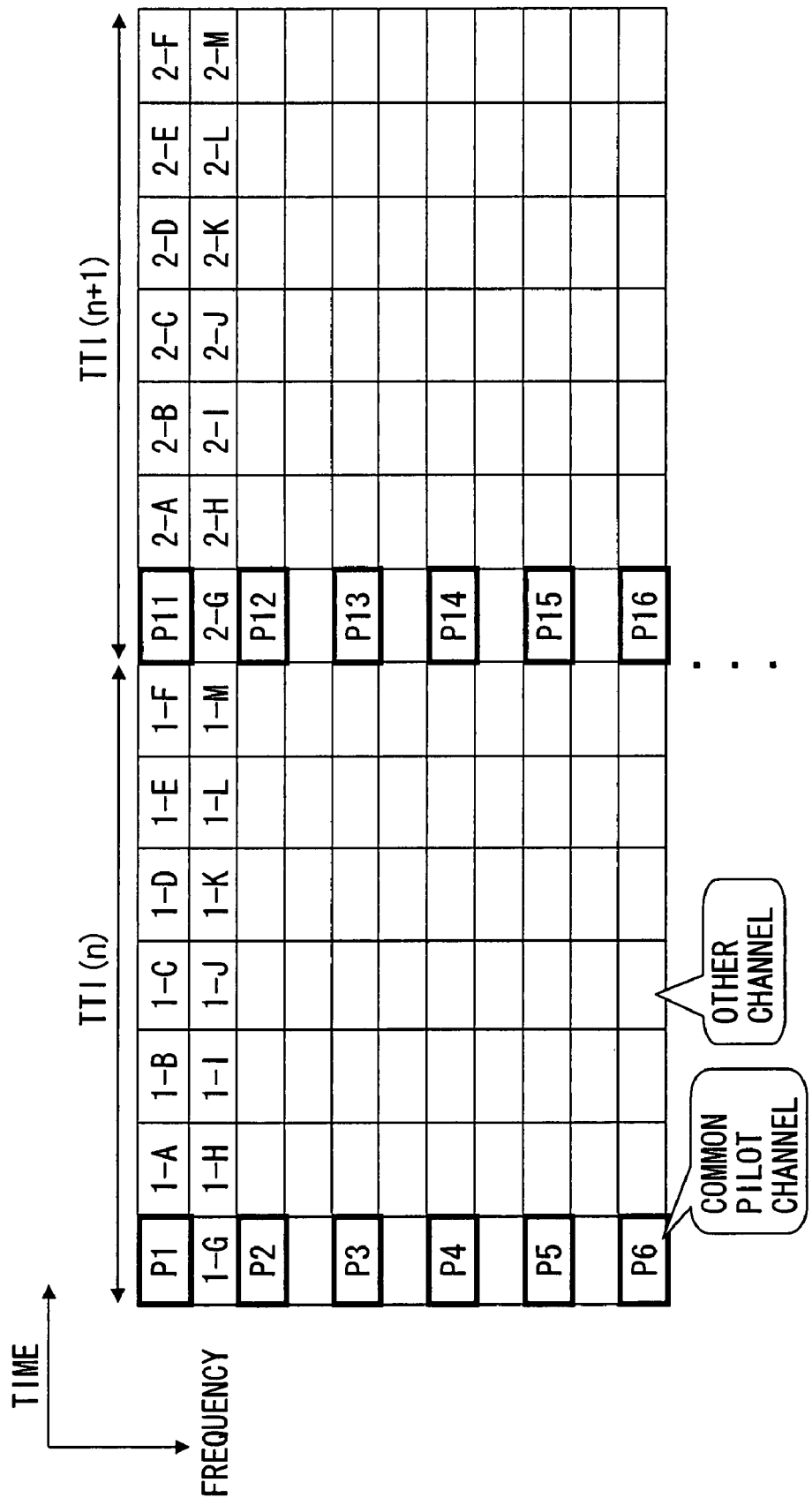
FIG. 2 is a diagram showing an example of radio frame in the present embodiment.

The wireless communication device in the present embodiment performs the communications by use of a radio frame shown in FIG. 2. FIG. 2 is a diagram illustrating an example of the radio frame in the present embodiment. In the radio frame shown in FIG. 2, one frame is formed at TTI. The frame is constructed of a plurality of subcarriers, wherein each subcarrier further consists of seven symbols arranged along a time axis. In the frame, common pilot channels (P1, P2, P3, etc) are allocated on a one-by-one basis to every two subcarriers at this ratio in a direction of a frequency axis with respect to the head symbols in the direction of the time axis. In the frame, pieces of user data etc are allocated to channels (data channels) other than the pilot channels. It should be noted that the present invention does not limit a subcarrier frequency interval at which the common pilot channels are arranged.

A radio frequency signal received by the receiving antenna 100 is transmitted to the receiving unit 101. The receiving unit 101 converts the received radio frequency signal into a baseband signal and further converts the thus-converted baseband signal into a digital signal. The S/P converting unit 101, upon receiving the converted digital signal, converts this digital signal into a plurality of parallel signals.

The DFT unit 102 executes a DFT process about the inputted parallel signals, and outputs a plurality of signals corresponding to the respective subcarrier components. These outputted parallel signals are transmitted respectively to the P/S converting unit 103 and to the channel estimation unit 105. The P/S converting unit 103 rearranges the received parallel signals into serial signals and thus transmits the serial signals to the demodulation unit 104.

The channel estimation unit 105 compares a pilot signal in the signals transferred from the DFT unit 102 with a known pilot signal, thereby obtaining a channel estimation value with respect to a link to the present receiving device from the transmitting device. The channel estimation unit 105 detects an allocation of the pilot signal in the signals transferred from the DFT unit 102 on the basis of pilot signal allocation information given from the frame requesting unit 111. This pilot signal allocation information will be described later on. The present invention does not limit this channel estimation method, and the channel estimation value may also be obtained by, e.g., an operation based on a least-squares method. The thus-obtained channel estimation value is defined as a propagation characteristic value related to the pilot channel to which the pilot signal is allocated. Such being the case, the channel estimation unit 105 acquires the channel estimation value with respect to the data channels, to which the pilot signals are not allocated, by a method such as linear interpolation in the direction of the frequency axis and in the direction of the time axis. The thus-acquired channel estimation value about each symbol of each subcarrier is sent to the demodulation unit 104. Further, the channel estimation value obtained from the pilot signal is sent to the receiving quality information generating unit 110.

The demodulation unit 104 performs synchronous detection and demodulation on the inputted serial signal by using the channel estimation value transferred from the channel estimation unit 105. The thus-demodulated signals are transferred to the decoding unit 106. The decoding unit 106 decodes the signals from the demodulation unit 104 by a predetermined coding rate and a predetermined decoding method. The decoded data are outputted as receiving data to other function units.

The receiving quality information generating unit 110 generates information representing a receiving quality. This information representing the receiving quality is, for example, an SINR (Signal to Interference and Noise Ratio) obtained based on the channel estimation value received from the channel estimation unit 105. In this case, the receiving quality information generating unit 110 obtains the SINR from desired power (S) of each pilot symbol and from interference noise power (I). The desired power of each symbol is acquired by, e.g., squaring an absolute value of the channel estimation value, while the interference noise power is acquired by, e.g., taking a correlation between the received signal and the pilot signal.

The receiving quality information generating unit 110 may obtain a bit error rate (BER) by way of another example. In this case, the receiving quality information generating unit 110 receives cyclic redundancy check (which will hereinafter be abbreviated to CRC) bits in the data decoded by the decoding unit 106 and checks the CRC bits, thereby obtaining the bit error rate (BER) in predetermined intervals. The "predetermined intervals" connote an interval between the two neighboring pilot channels in the direction of the time axis and an interval between the two neighboring pilot channels in the direction of the frequency axis. An example shown in FIG. 2 is that the bit error rate between a symbol 1-A and a symbol 1-F in the direction of the time axis and the bit error rate of a symbol 1-G in the direction of the frequency axis, are obtained. The thus-obtained receiving quality information is transferred to the frame requesting unit 111.

The frame requesting unit 111 determines, based on the receiving quality information about the pilot channels, an allocation of the pilot signals with respect to the radio frame used for the transmission between the transmitting device serving as a transmission partner device and the present receiving device. The frame requesting unit 111 determines the allocation of the pilot signals on the basis of three patterns that will be given as below.

(Pattern 1) The number of the pilot channels in the direction of the frequency axis is changed.

(Pattern 2) The number of the pilot channels in the direction of the time axis is changed.

(Pattern 3) An all-pilot frame (a training period) is requested.

The frame requesting unit 111, to begin with, determines the allocation of the pilot signals on the basis of the Pattern 1. In a case where the radio frame illustrated in FIG. 2 is received, the frame requesting unit 111 receives, from the receiving quality information generating unit 110, each piece of receiving quality information on each of the pilot channels with respect to the frame at TTI (n). The frame requesting unit 111 obtains each difference in the receiving quality information between the neighboring pilot channels in the direction of the frequency axis. The example in FIG. 2 is such that only the common pilot channels exist in this frame, and hence the receiving quality information is targeted at the respective pilot channels existing in head symbols of the frame. To be specific, the differences in the receiving quality information between the respective pilot channels in the direction of the frequency axis are acquired such as obtaining the difference between the receiving quality information of the pilot channel P1 and the receiving quality information of the pilot channel P2 and further obtaining the difference between the receiving quality information of the pilot channel P2 and the receiving quality information of the pilot channel P3. In the case of increasing the number of the pilot channels in the direction of the time axis according to the Pattern 2 that will be explained as below, the pilot channels allocated to the increased symbols are also set as the targets.

Figure 3:
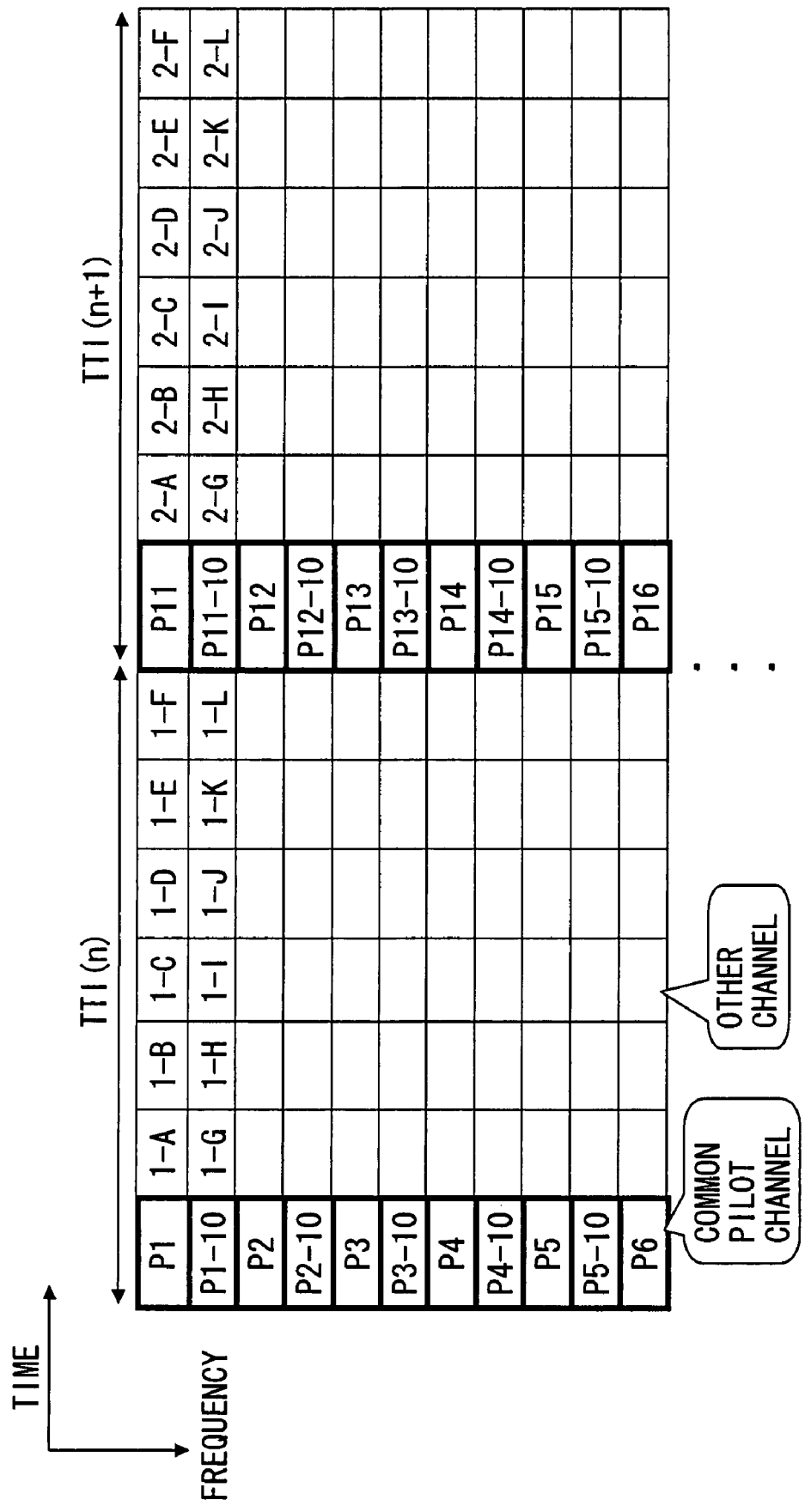
FIG. 3 is a diagram showing an example of a pilot channel allocation after a process in Pattern 1.

The frame requesting unit 111, when obtaining the differences in the receiving quality information between the respective pilot channels, further acquires an average value of these differences in the receiving quality information therebetween, and compares this average value with an upper limit threshold value retained beforehand. For instance, if the bit error rate is used as the receiving quality information, a value in the vicinity of 0.1 may be set as the upper limit threshold value (corresponding to a predetermined threshold value according to the present invention). The frame requesting unit 111, if the average value exceeds the upper limit threshold value, determines to increase the pilot channels in the direction of the frequency axis. As a result of the determination thus made, the radio frame to be transmitted from the transmitting device becomes as illustrated in FIG. 3. FIG. 3 is a diagram showing an example of the pilot channel allocation to be changed as the result of the determination of the frame requesting unit 111. The example in FIG. 3 shows an addition of the pilot channels (P1-10, P2-10, P3-10, P4-10, P5-10) in the direction of the frequency axis with respect to head symbols of the radio frame.

Thus, the pilot channel allocation to be changed as the result of the determination of the frame requesting unit 111 is handled based on a predetermined unit in the radio frame. For instance, in the example of the radio frame shown in FIG. 2, a range containing one common pilot channel (a range extending from the subcarrier containing P-1 to the subcarrier containing P-2) is dealt with as one unit in each frame. With this contrivance, the radio frame is changed so as to have the allocation of the same pilot channel on the basis of each unit within every frame.

The frame requesting unit 111 retains, in addition to the upper limit threshold value described above, a lower limit threshold value (corresponding to a predetermined threshold value according to the present invention). The frame requesting unit 111, when judging that the average value of the differences in the receiving quality information between the respective pilot channels is smaller than the lower limit threshold value, determines to decrease the pilot channels in the direction of the frequency axis. Note that the common pilot channel may not be deleted. Further, the upper limit threshold value described above and the lower limit threshold value explained above may be set into one threshold value.

The frame requesting unit 111 next determines the allocation of the pilot signals according to the Pattern 2. The frame requesting unit 111 acquires each difference in the receiving quality information between the neighboring pilot channels in the direction of the time axis. The example in FIG. 2 is that only the common pilots exist in the frame, and therefore the difference between the pilot channel in the frame at TTI(n) and the pilot channel in the frame at TTI(n+1) is obtained in every subcarrier. Specifically, the differences in the receiving quality information between the respective pilot channels in the direction of the time axis are acquired such as obtaining the difference between the receiving quality information of the pilot channel P1 and the receiving quality information of the pilot channel P11 and further obtaining the difference between the receiving quality information of the pilot channel P2 and the receiving quality information of the pilot channel P12.

Figure 4:
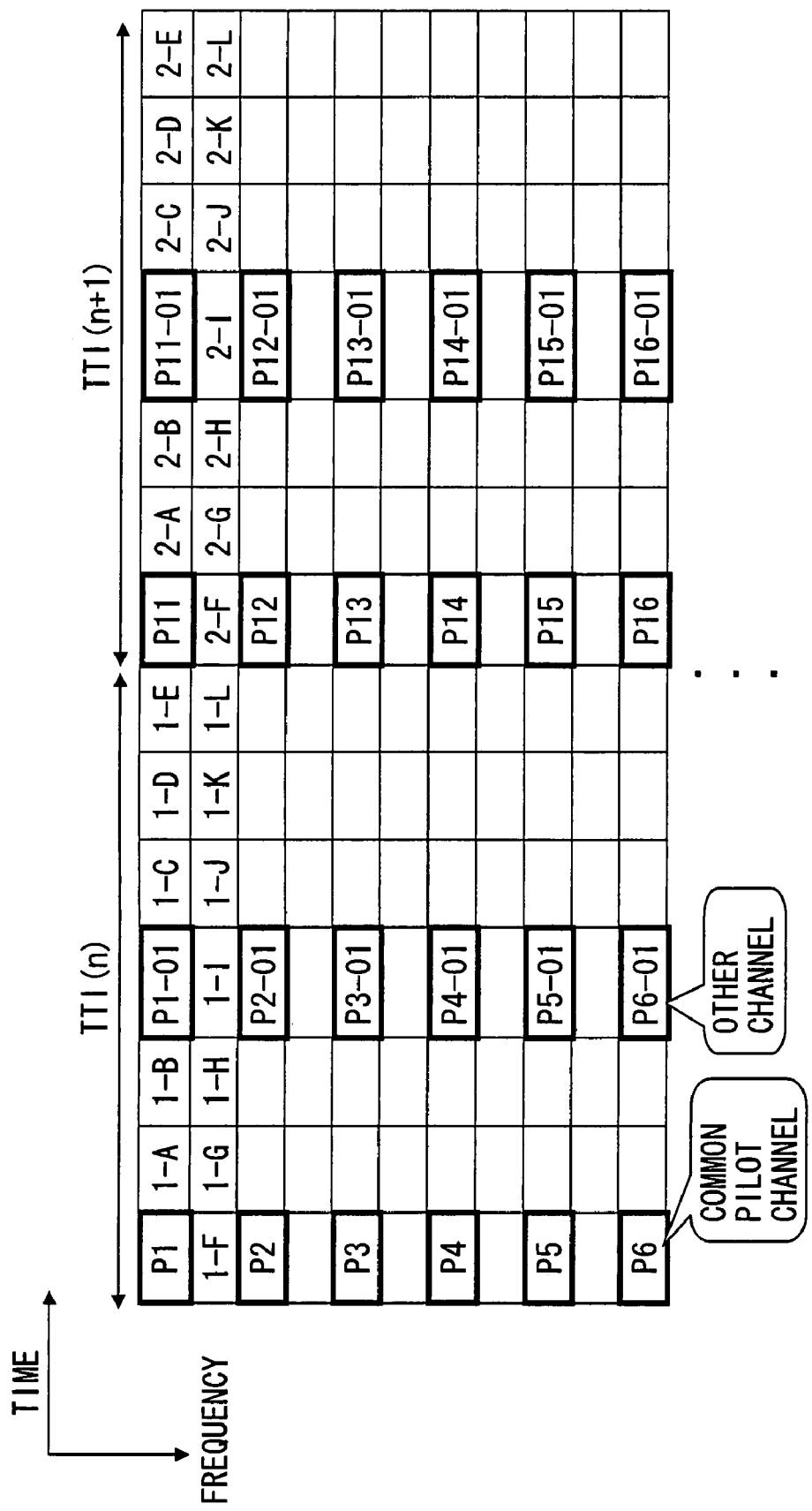
FIG. 4 is a diagram showing an example of the pilot channel allocation after a process in Pattern 2.

The frame requesting unit 111, when obtaining each difference in the receiving quality information between the respective pilot channels, further acquires an average value of these differences in the receiving quality information therebetween, and compares this average value with the previously retained upper limit threshold value. The upper limit threshold value may involve using the same value as in the Pattern 1 and may also involve taking another value. The frame requesting unit 111, if the average value exceeds the upper limit threshold value, determines to increase the pilot channels in the direction of the time axis. As a result of the determination thus made, the radio frame to be transmitted from the transmitting device becomes as illustrated in FIG. 4. FIG. 4 is a diagram showing an example of the pilot channel allocation to be changed as the result of the determination of the frame requesting unit 111. The example in FIG. 4 shows an addition of the pilot channels (P1-01, P2-01, P3-01, P4-01, P5-01) in the direction of the time axis of the radio frame.

Figure 5:
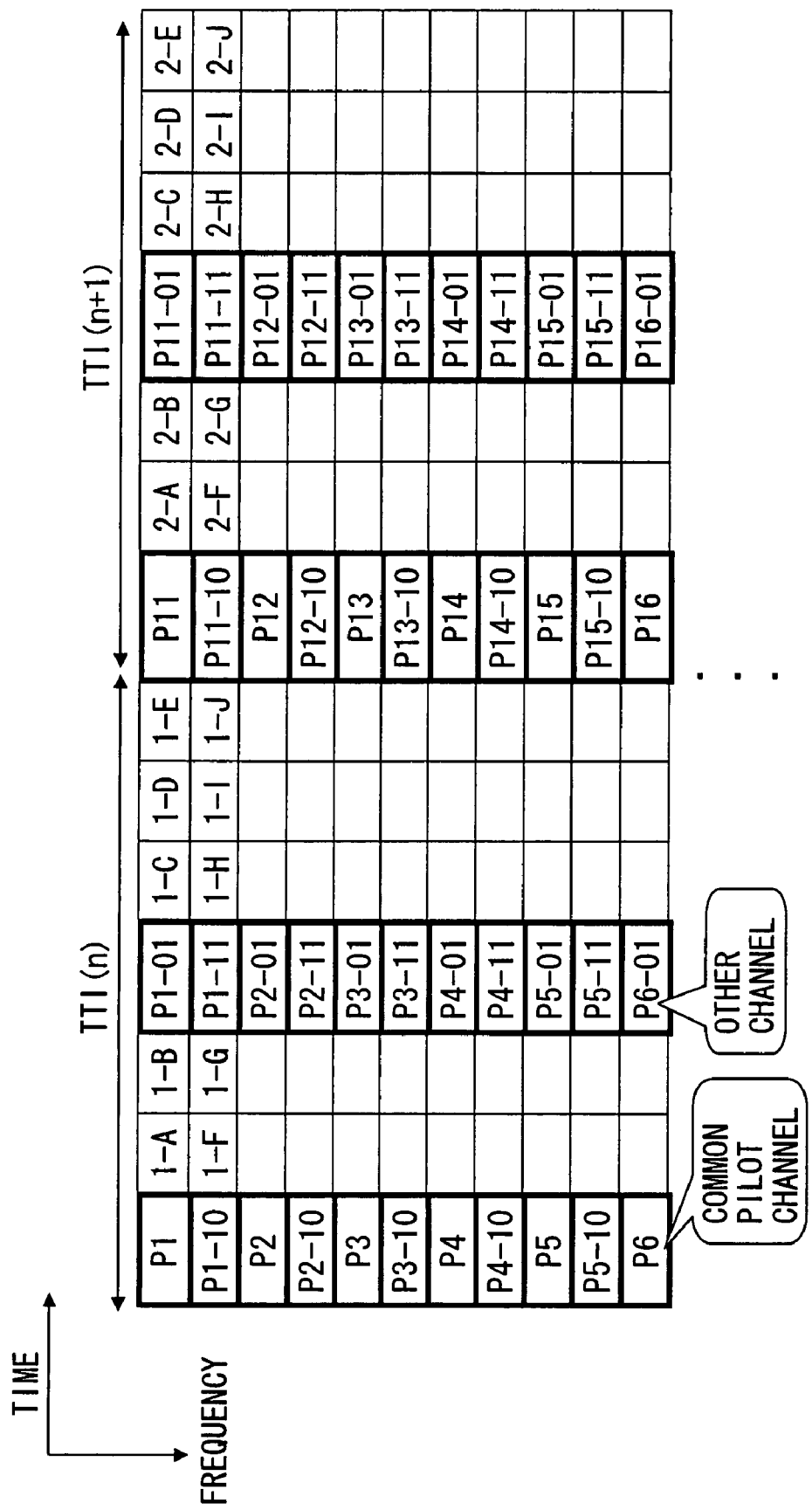
FIG. 5 is a diagram showing an example of the pilot channel allocation after the process in Pattern 1 and the process in Pattern 2.
Figure 6:
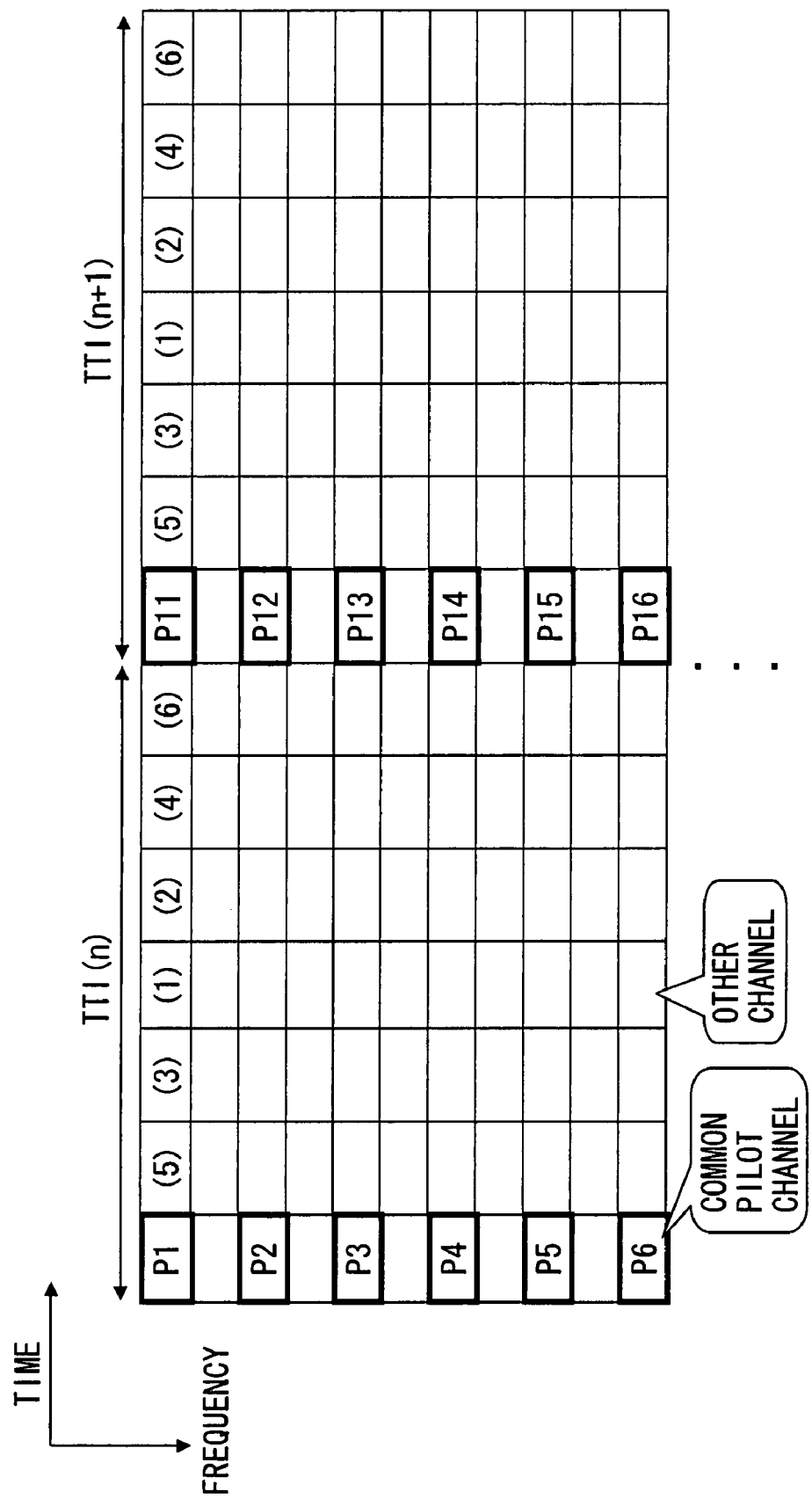
FIG. 6 is a diagram showing an increasing and/or decreasing sequence of the pilot channels in a direction of a time axis.

Thus, when the process in the Pattern 1 and the process in the Pattern 2 are executed each once, the pilot channel allocation becomes as shown in FIG. 5. FIG. 5 is a diagram showing the pilot channel allocation to be changed as a result of combining the process in the Pattern 1 with the process in the Pattern 2. The frame requesting unit 111, in the case of increasing the pilot channels in the direction of the time axis according to the Pattern 2, increases the pilot channels in a sequence shown in FIG. 6. FIG. 6 is a chart showing the sequence of increasing and decreasing the pilot channels in the direction of the time axis. The sequence is indicated by numeral values bracketed in FIG. 6. As described above, in the examples of the pilot channels allocations in FIGS. 4 and 5, the pilot signal is allocated to the channel indicated by a sequential number (1). Accordingly, in FIGS. 4 and 5, when further increasing the pilot channel in the direction of the time axis, it follows that the channel indicated by a sequential number (2) is determined to be the pilot channel.

Conversely when decreasing the number of the pilot channels, the pilot channels are decreased in a descending sequence organized by the sequential numbers shown in FIG. 6. The lower limit threshold value is utilized for the determination of decreasing the pilot channels in the direction of the time axis in the same way as in the Pattern 1 described above.

Figure 7:
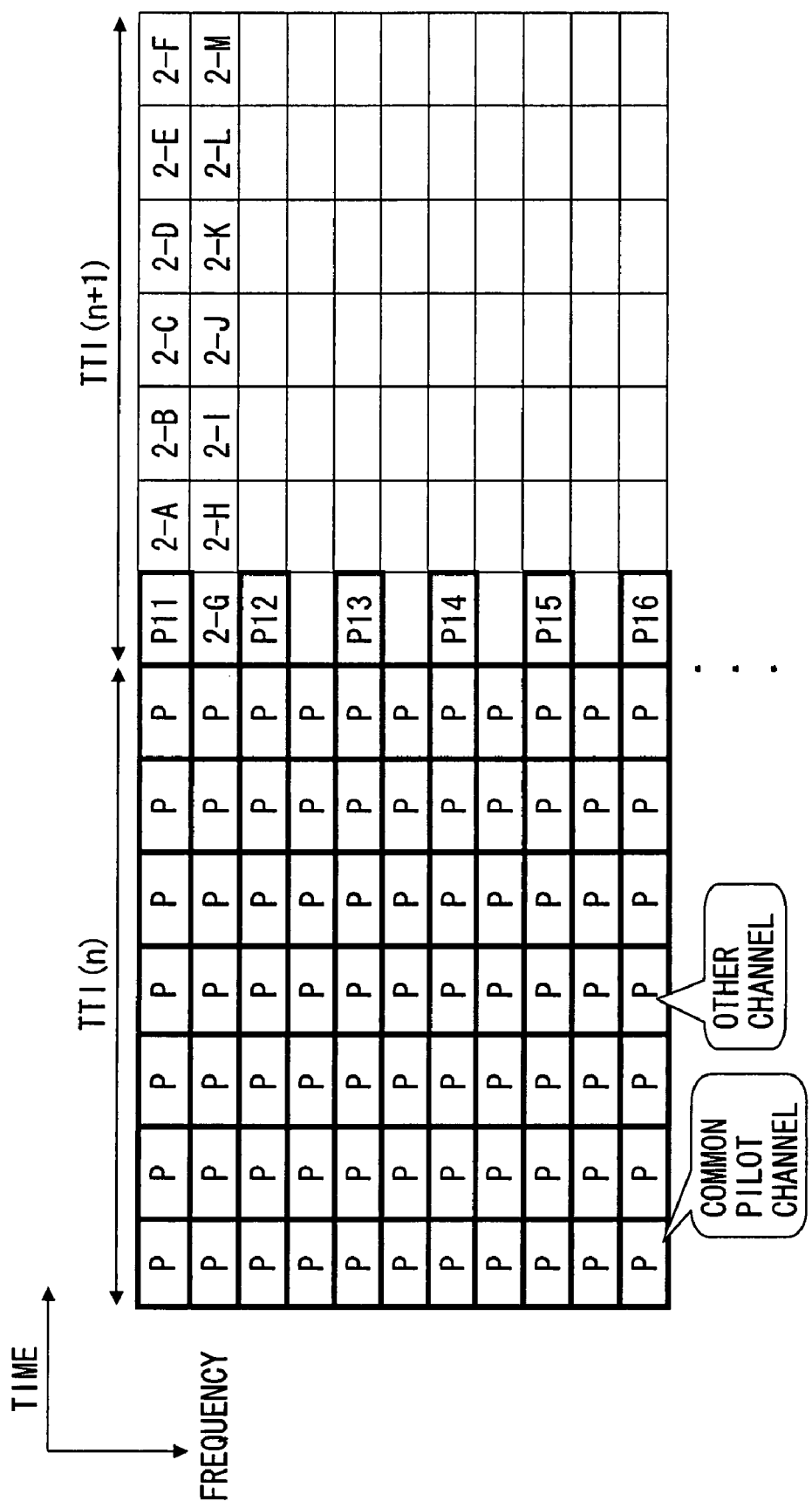
FIG. 7 is a diagram showing an all-pilot frame.

The frame requesting unit 111 previously retains a second upper limit threshold value (corresponding to a predetermined upper limit threshold value according to the present invention) in addition to the upper limit threshold value and the lower limit threshold value described above. The frame requesting unit 111, when judging that each of the differences in the receiving quality information between the respective pilot channels, which are obtained by the processes in the Patterns 1 and 2 described above, exceeds the upper limit threshold value, determines to require the all-pilot frame (Pattern 3). FIG. 7 is a diagram showing an example of a structure of the all-pilot frame. Note that FIG. 7 illustrates only one frame as the all-pilot frame, however, a plurality of all-pilot frames may also be continuously or discontinuously transmitted. The frame requesting unit 111 transfers the information of the pilot channel allocations determined according to the Patterns 1, 2 and 3 described above to the transmitting unit 112 and the channel estimation unit 105.

It is to be noted that the frame requesting unit 111, when receiving the all-pilot frame, executes the process in the Pattern 1 explained above and the process in the Pattern 2 described above with respect to the receiving quality information on all the pilot channels. Through this processing, the all-pilot frame comes to have a proper pilot channel allocation in a way that gradually decreases the pilot channels corresponding to a propagation environment.

The transmitting unit 112 generates the radio frame in which the pilot channel allocation information transferred from the frame requesting unit 111 is allocated to a control channel. The generated radio frame is transmitted from the transmitting antenna 120. The pilot channel allocation information generated by the transmitting unit 112 is allocated, in the form of bit data as shown in FIG. 8, to the control channel. FIG. 8 is a table showing an example of notification of the pilot channel allocation information. In the example in FIG. 8, a bit representing a process in the direction of the frequency axis, a bit representing a process in the direction of the time axis, a bit representing an addition/reduction of the pilot symbols, a bit representing a status and a bit representing an all-pilot request are arranged in a direction from a least significant bit (which will hereinafter be abbreviated to LSB) to a most significant bit (which will hereinafter be abbreviated to MSB).

The transmitting unit 112, when receiving an increase request in the direction of the frequency axis from the frame requesting unit 111, generates the pilot channel allocation information, wherein "1" is set in the bit representing the process in the direction of the frequency axis, "0" is set in the bit representing the process in the direction of the time axis, "0" is set in the bit representing the addition/reduction of the pilot symbols, "1" is set in the bit representing the status, and "0" is set in the bit representing the all-pilot request. The transmitting unit 112, conversely when receiving a decrease request in the direction of the frequency axis from the frame requesting unit 111, generates the pilot channel allocation information, wherein "1" is set in the bit representing the process in the direction of the frequency axis, "0" is set in the bit representing the process in the direction of the time axis, "1" is set in the bit representing the addition/reduction of the pilot symbols, "1" is set in the bit representing the status, and "0" is set in the bit representing the all-pilot request. Further, when receiving an all-pilot request, the transmitting unit 112 generates the pilot channel allocation information, wherein "1" is set in the bit representing the all-pilot request. Note that the transmitting unit 112, when receiving a request for retaining a status of the last time from the frame requesting unit 111, generates the pilot channel allocation information, wherein "0" is set in the bit representing the process in the direction of the frequency axis, "0" is set in the bit representing the process in the direction of the time axis, "0" is set in the bit representing the status, and "0" is set in the bit representing the all-pilot request.

Transmitting Device

Figure 9:
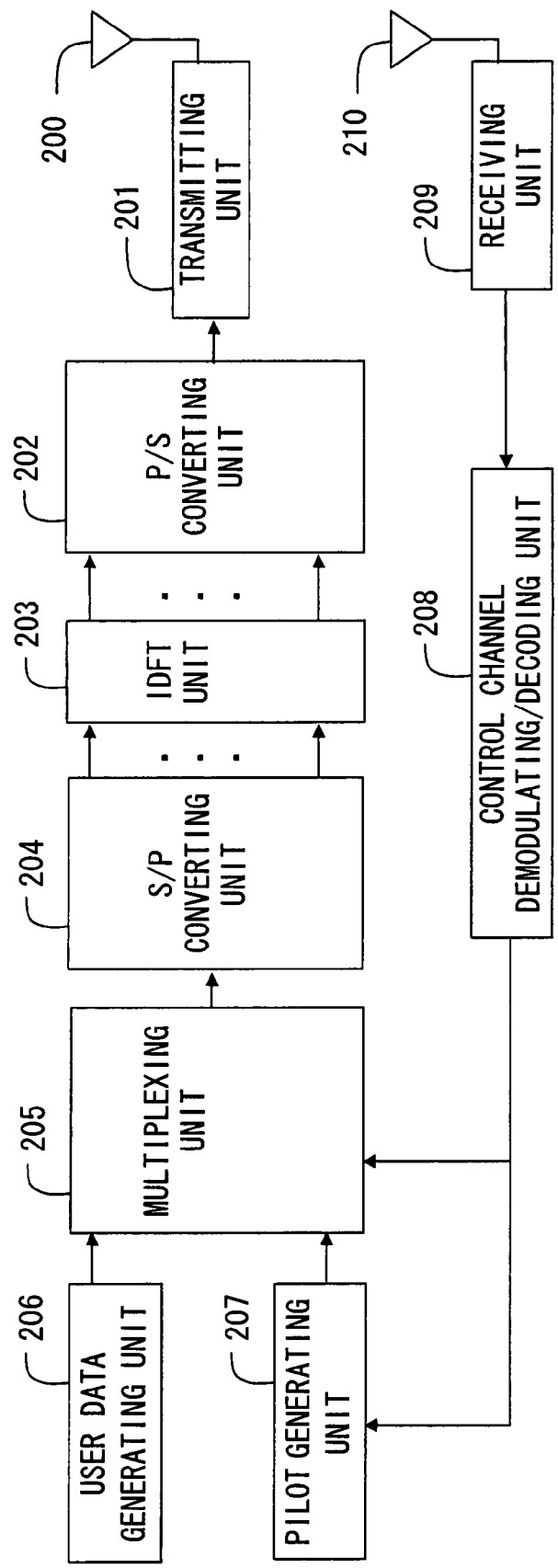
FIG. 9 is a diagram showing a functional configuration of a transmitting device in the present embodiment.

The transmitting device in the embodiment of the present invention will hereinafter be explained with reference to FIG. 9. FIG. 9 is a diagram illustrating a functional configuration of the transmitting device in the present embodiment.

The transmitting device in the present embodiment includes a transmitting antenna 200, a transmitting unit 201 (corresponding to transmitting unit according to the present invention), a parallel/serial (which will hereinafter be abbreviated to P/S) converting unit 202, an inverse discrete Fourier transform (which will hereinafter be abbreviated to IDFT) unit 203, a serial/parallel (which will hereinafter be abbreviated to S/P) converting unit 204, a multiplexing unit (corresponding to allocation unit according to the present invention) 205, a user data generating unit 206, a pilot generating unit 207, a control channel demodulating/decoding unit 208, a receiving unit 209, a receiving antenna 210, and so on.

The signals containing the pilot channel allocation information transmitted from the receiving device described above are received by the receiving antenna 210 and are transmitted to the receiving unit 209. The receiving unit 209 executes predetermined signal processing (such as baseband signal conversion, analog/digital conversion and the synchronous detection demodulation) with respect to the received radio frequency signals, and transfers a control channel signal in the outputted signals to the control channel demodulating/decoding unit 208.

The control channel demodulating/decoding unit 208 demodulates and decodes the control channel signal received from the receiving unit 209, and acquires the pilot channel allocation information (FIG. 8) contained in the control channel signal. The thus-acquired pilot channel allocation information is transmitted to the multiplexing unit 205 and to the pilot generating unit 207.

The user data generating unit 206 generates a user data signal to be given to the receiving device serving as a transmitting destination. The generated user data signal is transferred to the multiplexing unit 205. The pilot generating unit 207 generates the pilot signal on the basis of the pilot channel allocation information transferred from the control channel demodulating/decoding unit 208. The generated pilot signal is transferred to the multiplexing unit 205.

The multiplexing unit 205 determines the allocation of the pilot channels of the transmitting radio frame on the basis of the pilot channel allocation information transferred from the control channel demodulating/decoding unit 208, i.e., the pilot channel allocation information shown in FIG. 8, which has been transmitted from the receiving device described above, and multiplexes the pilot signal transmitted from the pilot generating unit 207 with the user data signal transmitted from the user data generating unit 206. Specifically, the multiplexing unit 205 retains the pilot channel allocation information about the present transmitting radio frame and reflects, in this pilot channel allocation information, pieces of information described in the pilot channel allocation information shown in FIG. 8. The radio frame multiplexed with the pilot symbols by the multiplexing unit 205 is formed in the way exemplified in FIGS. 2 through 5.

The multiplexing unit 205, when "1" is set in the bit representing the all-pilot request in the pilot channel allocation information, generates the all-pilot frame illustrated in FIG. 7. The multiplexing unit 205, it follows, does not multiplex the user data signal in the all-pilot frame. The signals multiplexed by the multiplexing unit 205 are transferred to the S/P converting unit 204.

The S/P converting unit 204 converts serial signals generated by the multiplexing unit 205 into parallel signals arranged in parallel corresponding to the number of the subcarriers. The IDFT unit 203 executes an IDFT process with respect to the parallel signals outputted from the S/P converting unit 204 on the unit of every OFDM symbol. The on-the-time-axis signals carried on the respective subcarriers, which are outputted from the IDFT unit 203, are synthetically multiplexed by the P/S converting unit 202 and then transmitted to the transmitting unit 201. The transmitting unit 201 converts the serial signals transmitted from the P/S converting unit 202 into the analog signals, then converts a central frequency of the signals into a radio transmission frequency, and transmits the signals from the transmitting antenna 200.

It should be noted that the receiving device and the transmitting device in the present embodiment discussed above use the IDFT for the frequency-time transform process and the DFT for the time-frequency transform process, however, the present invention does not limit these methods, wherein the frequency-time transform process may involve using inverse fast Fourier transform (IFFT), and the time-frequency transform process may involve using fast Fourier transform (FFT).

Operational Example

Figure 10:
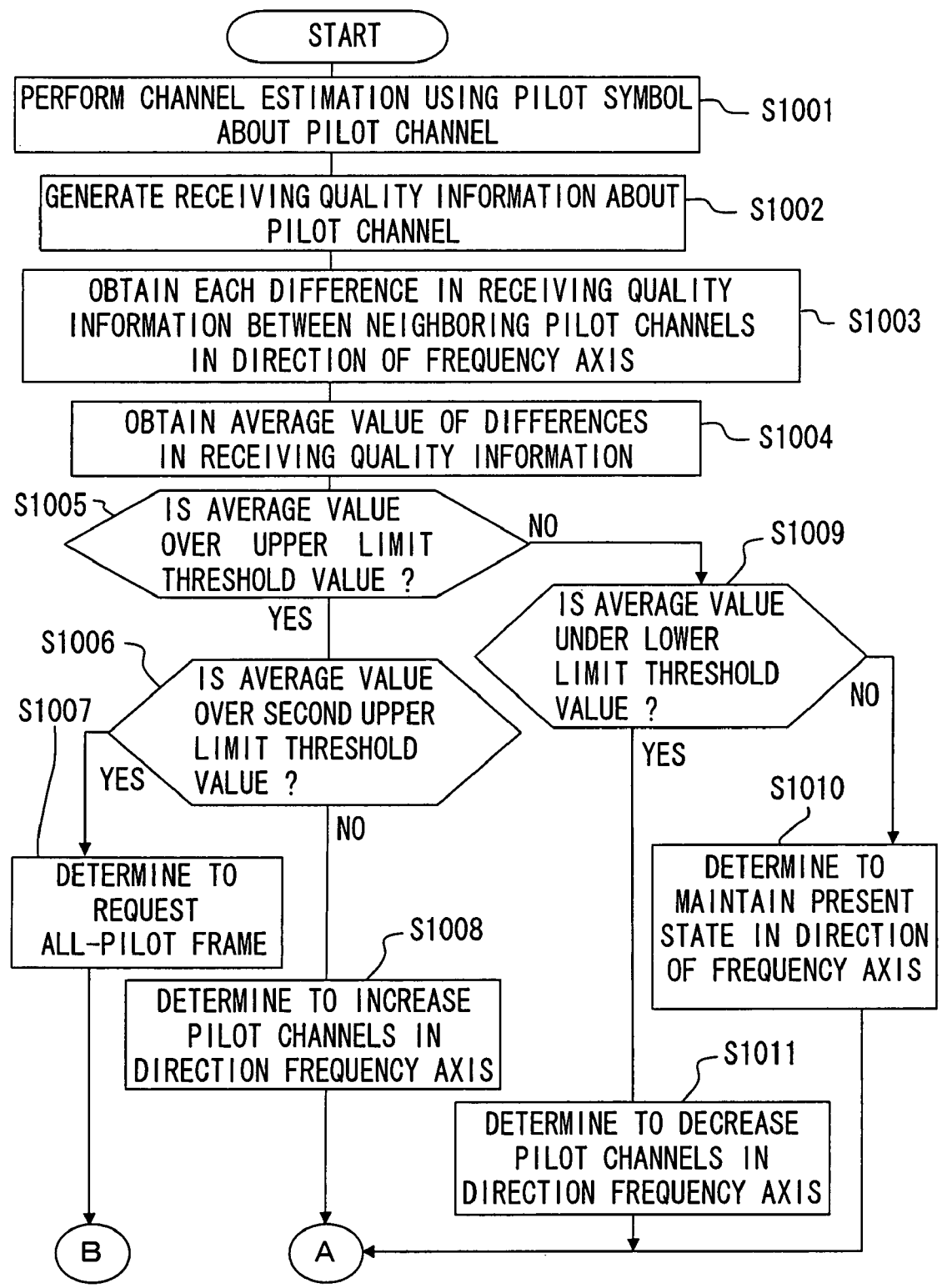
FIG. 10 is a flowchart showing an operational example of determining the pilot channel allocation in the receiving device.
Figure 11:
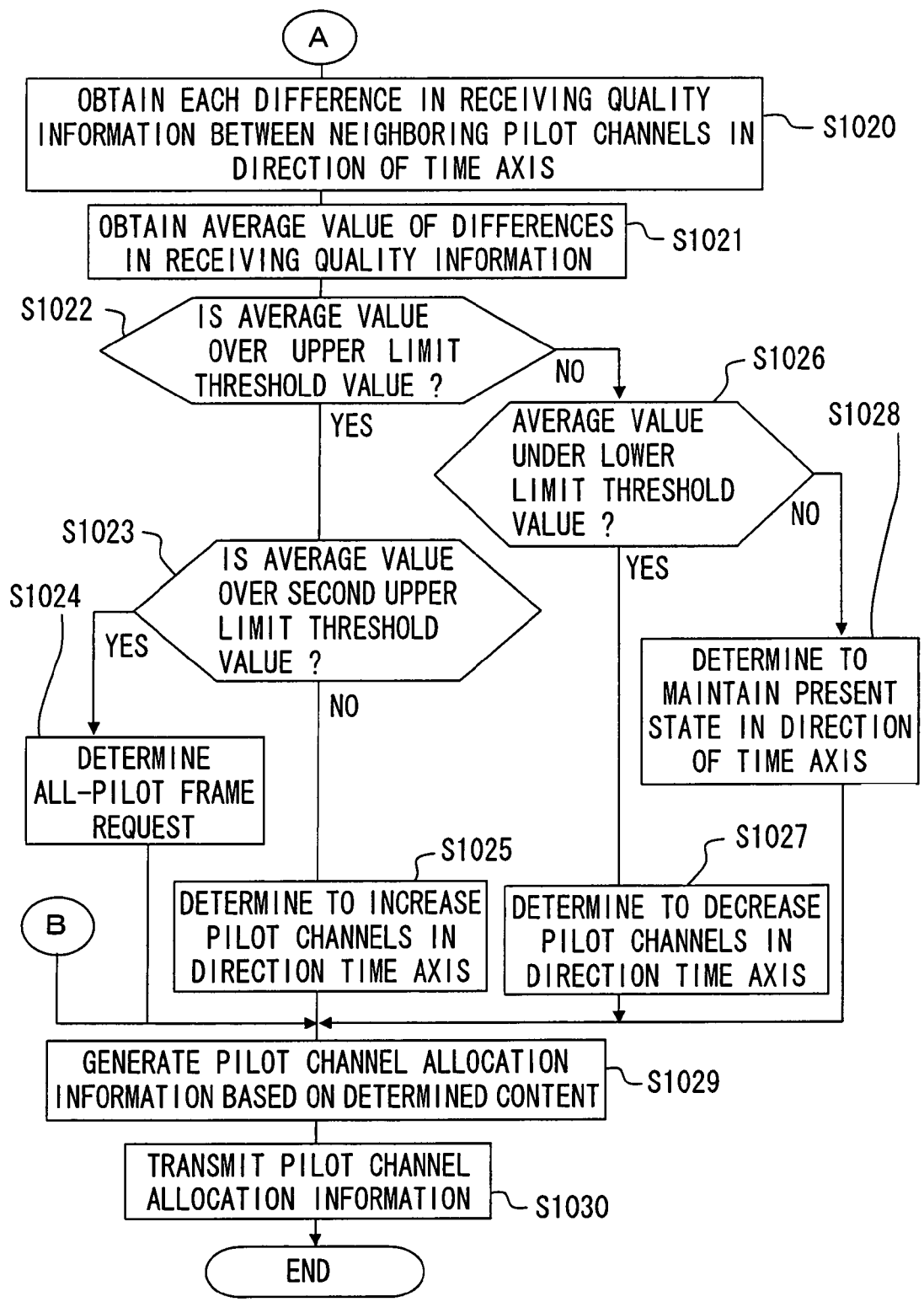
FIG. 11 is a flowchart showing an operational example of determining the pilot channel allocation in the receiving device.

Next, an operational example of the receiving device in the present embodiment will be explained with reference to FIGS. 10 and 11. FIGS. 10 and 11 are flowcharts showing the operational example of how the pilot channel allocation is determined in the receiving device.

The receiving device in the present embodiment executes the predetermined signal processing with respect to the radio transmission frequency signals received by the receiving antenna 100 (the receiving unit 101), and converts the digital signals obtained by this signal processing into the parallel signals (the S/P converting unit 101). The parallel signals are Fourier-transformed by the DFT unit 102, and the signals corresponding to the respective subcarrier components are outputted (the DFT unit 102). The channel estimation unit 105 compares each of the pilot symbols allocated to the pilot channels in the signals corresponding to the respective subcarrier components with the known pilot signal, thereby performing the channel estimation about the pilot channel (S1001).

Next, the receiving quality information generating unit 110 generates the receiving quality information about the pilot channel on the basis of the channel estimation value given from the channel estimation unit 105 or the CRC bit given from the decoding unit 106 (S1002). The receiving quality information is exemplified such as the SINR, the SNR and the bit error rate.

The frame requesting unit 111, upon receiving the receiving quality information, executes at first the process according to the Pattern 1 described above, i.e., the process of changing the pilot channels in the direction of the frequency axis. The frame requesting unit 111 obtains each difference in the receiving quality information between the respective neighboring pilot channels in the direction of the frequency axis (S1003). Then, the frame requesting unit 111 acquires the average value of the thus-obtained differences in the receiving quality information therebetween (S1004). Subsequently, the frame requesting unit 111 compares the average value of the thus-obtained differences in the receiving quality information in the direction of the frequency axis with the previously retained upper limit threshold value (S1005). The frame requesting unit 111, when judging from this comparison that the average value exceeds the upper limit threshold value (S1005; YES), further judges whether or not the average value exceeds the second upper limit threshold value (S1006). The frame requesting unit 111, when judging from this comparison that the average value exceeds the second upper limit threshold value (S1006; YES), determines the request for the all-pilot frame (S1007). While on the other hand, the frame requesting unit 111, when judging from this comparison that the average value does not exceed the second upper limit threshold value (S1006; NO), determines to increase the pilot channels in the direction of the frequency axis (S1008).

The frame requesting unit 111, when judging that the average value does not exceed the upper limit threshold value (S1005; NO), further judges whether or not the average value is smaller than the lower limit threshold value (S1009). The frame requesting unit 111, when judging from this comparison that the average value is smaller than the lower limit threshold value (S1009; YES), determines to decrease the pilot channels in the direction of the frequency axis (S1011). While on the other hand, the frame requesting unit 111, when judging that the average value is not smaller than the lower limit threshold value (S1009; NO), determines to maintain the present state, i.e., the present pilot channel allocation in the direction of the frequency axis (S1010).

The frame requesting unit 111, upon completing the process of changing the pilot channels in the direction of the frequency axis ("A" depicted in FIGS. 10 and 11), executes next the process according to the Pattern 2 described above, i.e., the process of changing the pilot channels in the direction of the time axis. Note that if the request for the all-pilot frame is determined from the previous judgment, none of the process related to the Pattern 2 is executed ("B" depicted in FIGS. 10 and 11).

The frame requesting unit 111 obtains each difference in the receiving quality information between the respective neighboring pilot channels in the direction of the time axis (S1020). Then, the frame requesting unit 111 acquires the average value of the thus-obtained differences in the receiving quality information therebetween (S1021). Subsequently, the frame requesting unit 111 compares the average value of the thus-obtained differences in the receiving quality information in the direction of the time axis with the previously retained upper limit threshold value (S1022). The frame requesting unit 111, when judging from this comparison that the average value exceeds the upper limit threshold value (S1022; YES), further judges whether or not the average value exceeds the second upper limit threshold value (S1023). The frame requesting unit 111, when judging from this comparison that the average value exceeds the second upper limit threshold value (S1023; YES), determines the request for the all-pilot frame (S1024). While on the other hand, the frame requesting unit 111, when judging from this comparison that the average value does not exceed the second upper limit threshold value (S1023; NO), determines to increase the pilot channels in the direction of the time axis (S1025).

The frame requesting unit 111, when judging that the average value does not exceed the upper limit threshold value (S1022; NO), further judges whether or not the average value is smaller than the lower limit threshold value (S1026). The frame requesting unit 111, when judging from this comparison that the average value is smaller than the lower limit threshold value (S1026; YES), determines to decrease the pilot channels in the direction of the time axis (S1027). While on the other hand, the frame requesting unit 111, when judging that the average value is not smaller than the lower limit threshold value (S1026; NO), determines to maintain the present state, i.e., the present pilot channel allocation in the direction of the time axis (S1028).

The frame requesting unit 111 generates the pilot channel allocation information on the basis of the thus-determined content (S1029), and transmits this pilot channel allocation information to the channel estimation unit 105 and to the transmitting unit 112. The channel estimation unit 105 detects, based on this pilot channel allocation information, the allocation of the pilot channels in regard to the respective signals transmitted from the DFT unit 102. The transmitting unit 112 generates the radio frame in which the pilot channel allocation information transferred from the frame requesting unit 111 is allocated to the control channel, and transmits this radio frame. The transmitting unit 112, on the occasion of generating the radio frame, sets the pilot channel allocation information as the bit data shown in FIG. 8.

The transmitting device receiving the radio frame containing this pilot channel allocation information comes to transmit, hereafter, the radio frame having the pilot channel allocation based thereon. Namely, the multiplexing unit 205 of the transmitting device multiplexes, based on this pilot channel allocation information, the pilot signal generated by the pilot generating unit 207 with the user data signal generated by the user data generating unit 206. The multiplexing unit 205, if the pilot channel allocation information is data that prompts the transmitting device to change the pilot channels in the direction of the time axis, determines the pilot channel allocation in the sequence shown in, e.g., FIG. 6. Further, the multiplexing unit 205, if the pilot channel allocation information is the data representing the request for the all-pilot frame, outputs the all-pilot frame that does not involve multiplexing the user data signal.

Note that the receiving device receiving the all-pilot frame, the receiving quality information on all the pilot channels being generated, executes the process in the Pattern 1 and the process in the Pattern 2 with respect to this generated receiving quality information on all the pilot channels. Through this processing, the all-pilot frame comes to have the proper pilot channel allocation in a way that gradually decreases the pilot channels corresponding to the propagation environment.

Operation/Effect in First Embodiment

In the receiving device in the present embodiment, when receiving the OFDM signals transmitted from the transmitting device, the predetermined signal processing is executed with respect to these receiving signals, whereby the signals corresponding to the respective subcarrier components are outputted. In the receiving signals, the plural pilot signals are allocated at the predetermined intervals respectively in the direction of the time axis and in the direction of the frequency axis, and the channel estimation unit 105 performs the channel estimation with respect to each pilot channel by use of the pilot symbol allocated to the pilot channel in the signals corresponding to the individual subcarrier components. Subsequently, the receiving quality information generating unit 110 generates the receiving quality information (for example, the SINR, the SNR and the BER) related to each pilot channel by using the channel estimation value or the CRC bit given from the decoding unit 106.

The frame requesting unit 111 executes at first, based on the receiving quality information on each pilot channel, the process (the Pattern 1) of changing the number of the pilot channels in the direction of the frequency axis. The process according to this Pattern 1 involves obtaining each difference in the receiving quality information between the respective neighboring pilot channels in the direction of the frequency axis and acquiring the average value of the thus-obtained differences in the receiving quality information therebetween. The thus-acquired average value of the differences in the receiving quality information in the direction of the frequency axis is compared with the pre-retained upper limit threshold value, the pre-retained second upper limit threshold value and the pre-retained lower limit threshold value, thereby determining the contents of how the number of the pilot channels in the direction of the frequency axis is changed. Namely, the request for the all-pilot frame is determined in the case of Average Value>Second Upper Limit Threshold Value>Upper Limit Threshold Value, the increase in the pilot channels in the direction of the frequency axis is determined in the case of Second Upper Limit Threshold Value≧Average Value>Upper Limit Threshold Value, the decrease in the pilot channels in the direction of the frequency axis is determined in the case of Lower Limit Threshold Value>Average Value, and none of the change (present state) in the pilot channels in the direction of the frequency axis is determined in other cases.

Next, the frame requesting unit 111 executes, based on the receiving quality information on each pilot channel, the process (the Pattern 2) of changing the number of the pilot channels in the direction of the time axis. The process according to this Pattern 2 involves obtaining each difference in the receiving quality information between the respective neighboring pilot channels in the direction of the time axis and acquiring the average value of the thus-obtained differences in the receiving quality information therebetween. The thus-acquired average value of the differences in the receiving quality information in the direction of the time axis is compared with the pre-retained upper limit threshold value, the pre-retained second upper limit threshold value and the pre-retained lower limit threshold value, thereby determining the contents of how the number of the pilot channels in the direction of the time axis is changed. The detailed determination method is the same as by the Pattern 1.

The pilot channel allocation information is generated based on the thus-determined contents of how the pilot channels are changed, and there is transmitted the radio frame in which this pilot channel allocation information is allocated to the control channel. Further, the channel estimation unit 105 utilizes this pilot channel allocation information in order to know the allocation of the pilot channels in the received signals.

The transmitting device in the present embodiment, when receiving the radio frame containing the pilot channel allocation information, transmits hereafter the radio frame in which this pilot channel allocation information is reflected. Note that, in this case, if the pilot channel allocation information is the data representing the request for the all-pilot frame, there is outputted the all-pilot frame that does not involve multiplexing the user data signal.

Thus, in the present embodiment, the receiving device determines, based on the receiving quality information on the respective pilot channels, the pilot channel allocation information containing the necessary number of the pilot channels etc, and notifies the transmitting device of the pilot channel allocation information, while the transmitting device transmits the radio frame in which the notified pilot channel allocation information is reflected.

Therefore, it is possible to take the pilot channel allocating configuration corresponding to the channel propagation environment, to improve the communication performance such as the receiving error rate and to prevent a decrease in the transmission rate that is caused by a futile allocation of the pilot channels. Moreover, the control is executed so as to take the proper pilot channel allocating configuration corresponding to the now-and-then propagation environment, whereby the device can be made less likely to be affected by fading that depends on the propagation environment etc.

Especially when the difference in the receiving quality information between the respective pilot channels rises, i.e., even in such a case that the fading exerts large influence, it follows that the control is performed so as to promptly take the proper pilot channel allocation due to the all-pilot frame request determined based on the second upper limit threshold value larger than the upper limit threshold value.

Others

The disclosures of Japanese patent application No. JP2006-074359, filed on Mar. 17, 2006 including the specification, drawings and abstract are incorporated herein by reference.

What is claimed is:

1. A receiving device receiving a multi-carrier signal in which a plurality of pilot signals transmitted from a transmitting device are allocated in a direction of a time axis and in a direction of a frequency axis, comprising:
 a quality generating unit generating each piece of receiving quality information on each of pilot channels for transmitting each of the plurality of pilot signals;
 a determining unit determining the number of the pilot channels needed in the multi-carrier signal transmitted from the transmitting device based on each piece of the receiving quality information; and
 a notifying unit transmitting a signal requesting the determined number of the pilot channels to the transmitting device.

2. A receiving device according to claim 1, wherein the determining unit determines the necessary number of the pilot channels in the direction of the frequency axis based on each piece of the receiving quality information on the neighboring pilot channels in the direction of the frequency axis, and/or determines the necessary number of the pilot channels in the direction of the time axis based on each piece of the receiving quality information on the neighboring pilot channels in the direction of the time axis.

3. A receiving device according to claim 2, wherein
 the quality generating unit obtains an average value of differences in each piece of the receiving quality information between the neighboring pilot channels in the direction of the frequency axis, and/or obtains an average value of differences in each piece of the receiving quality information between the neighboring pilot channels in the direction of the time axis, and
 the determining unit determines the necessary number of the pilot channels in the direction of the frequency axis based on the average value in the direction of the frequency axis, and/or determines the necessary number of the pilot channels in the direction of the time axis based on the average value in the direction of the time axis.

4. A receiving device according to claim 2, wherein the determining unit determines to increase and decrease the necessary number of the pilot channels in the direction of the frequency axis by comparing a value corresponding to each piece of the receiving quality information on the neighboring pilot channels in the direction of the frequency axis with a predetermined threshold value, and/or determines to increase and decrease the necessary number of the pilot channels in the direction of the time axis by comparing a value corresponding to each piece of the receiving quality information on the neighboring pilot channels in the direction of the time axis with a predetermined threshold value.

5. A receiving device according to claim 3, wherein the determining unit determines to increase and decrease the necessary number of the pilot channels in the direction of the frequency axis by comparing the average value in the direction of the frequency axis with a predetermined threshold value, and/or determines to increase and decrease the necessary number of the pilot channels in the direction of the time axis by comparing the average value in the direction of the time axis with a predetermined threshold value.

6. A receiving device according to claim 4, wherein
 the determining unit determines a request for an all-pilot frame by comparing a value corresponding to each piece of the receiving quality information on the neighboring pilot channels in the direction of the frequency axis with a predetermined upper limit threshold value, and/or determines the request for the all-pilot frame by comparing a value corresponding to each piece of the receiving quality information on the neighboring pilot channels in the direction of the time axis with the predetermined upper limit threshold value, and
 the notifying unit transmits the signal requesting the all-pilot frame to the transmitting device.

7. A receiving device according to claim 5, wherein
 the determining unit determines the request for the all-pilot frame by comparing the average value in the direction of the frequency axis with a predetermined upper limit threshold value, and/or determines the request for the all-pilot frame by comparing the average value in the direction of the time axis with a predetermined upper limit threshold value, and
 the notifying unit transmits the signal requesting the all-pilot frame to the transmitting device.

8. A transmitting device comprising:
 an allocation unit to determine allocations, in a direction of a time axis and in a direction of a frequency axis, of pilot signals which are transmitted on pilot channels and are used by a receiving device to generate each piece of receiving quality information on each of the pilot channels depending on the requested number of the pilot channels of which the receiving device notifies the transmitting device; and
 a transmitting unit to transmit a multi-carrier signal having the determined allocations of the pilot signals.

9. A transmitting device according to claim 8, wherein the transmitting unit, when receiving, from the receiving device, a request for an all-pilot frame that consists of only pilot signals, transmits the multi-carrier signal having the all-pilot frame.

10. A wireless communication system having a transmitting device and a receiving device receiving that perform communication by using a multi-carrier signal in which a plurality of pilot signals are allocated in a direction of a time axis and in a direction of a frequency axis,
 the receiving device comprising:
  a quality generating unit generating each piece of receiving quality information on each of pilot channels for transmitting each of the plurality of pilot signals;

a determining unit determining the number of the pilot channels needed in the multi-carrier signal transmitted from the transmitting device based on each piece of the receiving quality information; and a notifying unit transmitting a signal requesting the determined number of the pilot channels to the transmitting device, the transmitting device comprising:

an allocation unit determining allocations of pilot signals in the direction of the time axis and in the direction of the frequency axis, corresponding to a requested number of pilot channels which is contained in the signal transmitted from the receiving device; and a transmitting unit transmitting the multi-carrier signal having the determined allocations of the pilot signals.

11. A wireless communication system according to claim 10, wherein the determining unit determines the necessary number of the pilot channels in the direction of the frequency axis based on each piece of the receiving quality information on the neighboring pilot channels in the direction of the frequency axis, and/or determines the necessary number of the pilot channels in the direction of the time axis based on each piece of the receiving quality information on the neighboring pilot channels in the direction of the time axis.

12. A wireless communication system according to claim 11, wherein the determining unit determines to increase and decrease the necessary number of the pilot channels in the direction of the frequency axis by comparing a value corresponding to each piece of the receiving quality information on the neighboring pilot channels in the direction of the frequency axis with a predetermined threshold value, and/or determines to increase and decrease the necessary number of the pilot channels in the direction of the time axis by comparing a value corresponding to the receiving quality information on the neighboring pilot channels in the direction of the time axis with a predetermined threshold value.

13. A wireless communication system according to claim 12, wherein the determining unit determines a request for an all-pilot frame by comparing a value corresponding to each piece of the receiving quality information on the neighboring pilot channels in the direction of the frequency axis with a predetermined upper limit threshold value, and/or determines the request for the all-pilot frame by comparing a value corresponding to each piece of the receiving quality information on the neighboring pilot channels in the direction of the time axis with a predetermined upper limit threshold value, the notifying unit transmits the signal requesting the all-pilot frame to the transmitting device, and the transmitting unit, when receiving a notification of the request for the all-pilot frame from the receiving device, transmits the multi-carrier signal having the all-pilot frame.

* * * * *